(12) United States Patent
Okuyama (10) Patent No.: US 9,229,527 B2
(45) Date of Patent: Jan. 5, 2016

(54) IMAGE DISPLAY DEVICE, IMAGE DISPLAY METHOD, AND PROGRAM

(75) Inventor: Toshiyuki Okuyama, Kanagawa (JP)

(73) Assignee: NEC CORPORATION, Tokyo (JP)

( * ) Notice: Subject to any disclaimer, the term of this patent is extended or adjusted under 35 U.S.C. 154(b) by 182 days.

(21) Appl. No.: 13/978,017

(22) PCT Filed: Jan. 26, 2012

(86) PCT No.: PCT/JP2012/051678
§ 371 (c)(1),
(2), (4) Date: Jul. 2, 2013

(87) PCT Pub. No.: WO2012/108273
PCT Pub. Date: Aug. 16, 2012

(65) Prior Publication Data
US 2013/0271366 A1   Oct. 17, 2013

(30) Foreign Application Priority Data
Feb. 9, 2011  (JP) .................................. 2011-026101

(51) Int. Cl.
*G09G 5/00* (2006.01)
*G06F 3/01* (2006.01)
*G09G 5/36* (2006.01)

(52) U.S. Cl.
CPC .. *G06F 3/01* (2013.01); *G09G 5/00* (2013.01); *G09G 5/36* (2013.01); *G09G 2320/0261* (2013.01); *G09G 2340/0492* (2013.01)

(58) Field of Classification Search
CPC .... G06F 3/01; G09G 5/00; G09G 2320/0261; G09G 2340/0492; G09G 5/36
USPC .......................................................... 345/156
See application file for complete search history.

(56) References Cited

U.S. PATENT DOCUMENTS

| | | | |
|---|---|---|---|
| 6,300,933 B1 | 10/2001 | Nagasaki et al. | |
| 8,643,703 B1* | 2/2014 | Karakotsios et al. | 348/47 |
| 8,878,773 B1* | 11/2014 | Bozarth | 345/156 |
| 8,913,004 B1* | 12/2014 | Bozarth et al. | 345/156 |
| 2005/0104848 A1 | 5/2005 | Yamaguchi et al. | |
| 2009/0048001 A1 | 2/2009 | Mihara et al. | |

FOREIGN PATENT DOCUMENTS

| | | |
|---|---|---|
| CN | 1574884 A | 2/2005 |
| JP | 09-081305 A | 3/1997 |

(Continued)

OTHER PUBLICATIONS

Communication dated Nov. 4, 2014, issued by the State Intellectual Property Office of P.R. China in counterpart Chinese application No. 201280008357.3.

Primary Examiner — Adam R Giesy
(74) Attorney, Agent, or Firm — Sughrue Mion, PLLC (57) ABSTRACT

An image display device includes: a display unit that displays images; an imaging unit that captures an image of a subject that faces the display unit; a detection unit that detects motion with respect to the image display device by the user of the image display device; an estimation unit that, when predetermined motion has been detected by the detection unit, estimates the inclination with respect to the display unit of a person's face that was captured by the imaging unit; and a display orientation alteration unit that alters the orientation of images displayed on the display unit according to the inclination that was estimated.

9 Claims, 4 Drawing Sheets

(56) References Cited

FOREIGN PATENT DOCUMENTS

| JP | 2005-100084 A | 4/2005 |
| JP | 2009-049512 A | 3/2009 |
| JP | 2009-294728 A | 12/2009 |
| JP | 2010-171892 A | 8/2010 |
| JP | 2010-193494 A | 9/2010 |
| JP | 2011-034029 A | 2/2011 |
| JP | 2011-138449 A | 7/2011 |
| JP | 2011-203860 A | 10/2011 |
| JP | 2011-221094 A | 11/2011 |

* cited by examiner

Fig.6

IMAGE DISPLAY DEVICE, IMAGE DISPLAY METHOD, AND PROGRAM

CROSS REFERENCE TO RELATED APPLICATIONS

This is a National Stage of International Application No. PCT/JP2012/051678, filed Jan. 26, 2012, claiming priority based on Japanese Patent Application No. 2011-026101, filed Feb. 9, 2011, the contents of all of which are incorporated herein by reference in their entirety.

TECHNICAL FIELD

The present invention relates to an image display device that displays images, an image display method, and a program.

BACKGROUND ART

In recent years, image display devices such as portable terminals that display images are increasingly seen that have the function of automatically altering the orientation of a displayed image to facilitate viewing.

According to this function, an acceleration sensor is provided in the image display device, and when gravity acceleration is detected in this acceleration sensor, the orientation in which the image display device is being supported is estimated and the orientation of the displayed image then altered based on the estimation result.

In addition, Patent Document 1 discloses technology whereby the display orientation of an image is switched according to the attitude (position) of the case of the portable terminal device.

In the technology disclosed in Patent Document 1, the viewing orientation by which the user of a portable terminal views the screen of the portable terminal is estimated based on attitude information indicating the attitude of the case of the portable terminal. Image display is then carried out according to the estimated viewing orientation and attitude information.

LITERATURE OF THE PRIOR ART

Patent Documents

Patent Document 1: Japanese Unexamined Patent Application Publication No. 2009-049512

SUMMARY OF THE INVENTION

Problem to be Solved by the Invention

Nevertheless, despite the use of the above-described method that employs an acceleration sensor or the technology disclosed in Patent Document 1, the problem arises that an image assumes an orientation that interferes with viewing due to the degree of force with which the user of the image display device supports the image display device or due to the position of the viewer that views the displayed image.

Although the function by which the orientation of a displayed image is changed automatically can be temporarily disabled, this not only prevents effective utilization of the function by which the orientation of an image can be automatically changed but also requires the predetermination of the orientation in which an image is to be displayed. In other words, the problem arises in which convenience is reduced.

It is an object of the present invention to provide an image display device, an image display method, and a program that, without entailing loss of convenience, can prevent the problem in which a displayed image assumes an orientation that interferes with viewing.

Means for Solving the Problem

The image display device of the present invention for achieving the above-described object includes:
a display unit that displays an image;
an imaging unit that captures an image of a subject that faces the display unit;
a detection unit that detects motion with respect to the image display device by the user of the image display device;
an estimation unit that estimates inclination of a person's face with respect to the display unit from an image that was captured in the imaging unit; and
a display orientation alteration unit that alters the orientation of an image displayed on the display unit according to the inclination that was estimated.

In addition, the image display method of the present invention for achieving the above-described object is an image display method in an image display device that is equipped with a display unit that displays images and includes:
a process of capturing an image of a subject that faces the display unit;
a detection process of detecting motion with respect to the image display device by the user of
the image display device;
an estimation process of, when predetermined motion is detected in the detection process, estimating the inclination of the face of a person with respect to the display unit based on the image that was captured; and
a process of altering the orientation of the image that is displayed on the display unit according to the inclination that was estimated.

The program of the present invention for achieving that above-described object causes an image display device that is equipped with a display unit that displays images to execute:
a function of capturing the image of a subject that faces the display unit;
a detection function of detecting motion with respect to the image display device by the user of the image display device;
an estimation function of, when a predetermined motion is detected by the detection function, estimating the inclination of a person's face with respect to the display unit based on the image that was captured; and
a function of altering the orientation of the image that is displayed on the display unit according to the inclination that was estimated.

Effect of the Invention

Due to the above-described configuration, the present invention is able, without entailing a loss of convenience, to avoid the problem that a displayed image assumes an orientation that impedes viewing.

DETAILED DESCRIPTION OF THE EXEMPLARY EMBODIMENTS

An exemplary embodiment of the present invention is next described with reference to the accompanying drawings.

Figure 1:
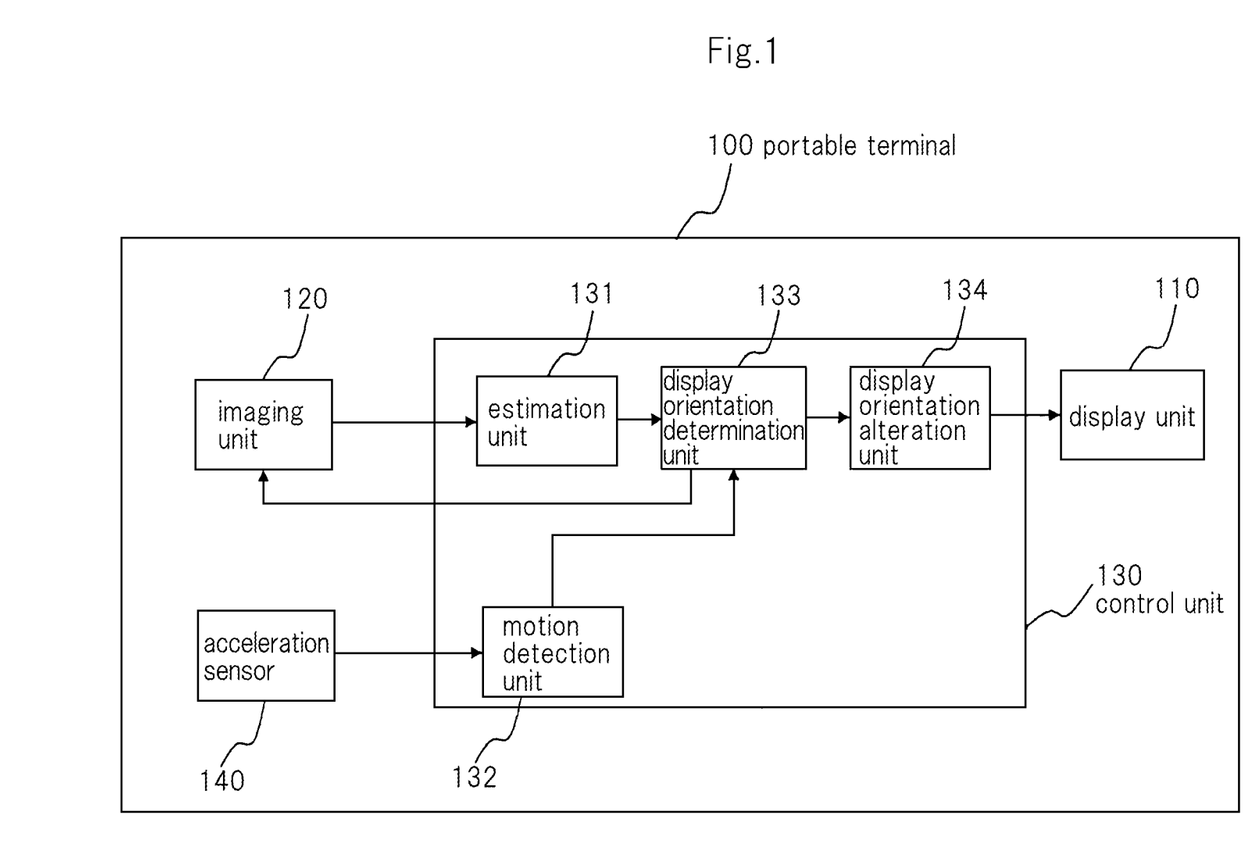
FIG. 1 is a block diagram showing an exemplary embodiment of a portable terminal in which the image display device of the present invention is applied.
Figure 2:
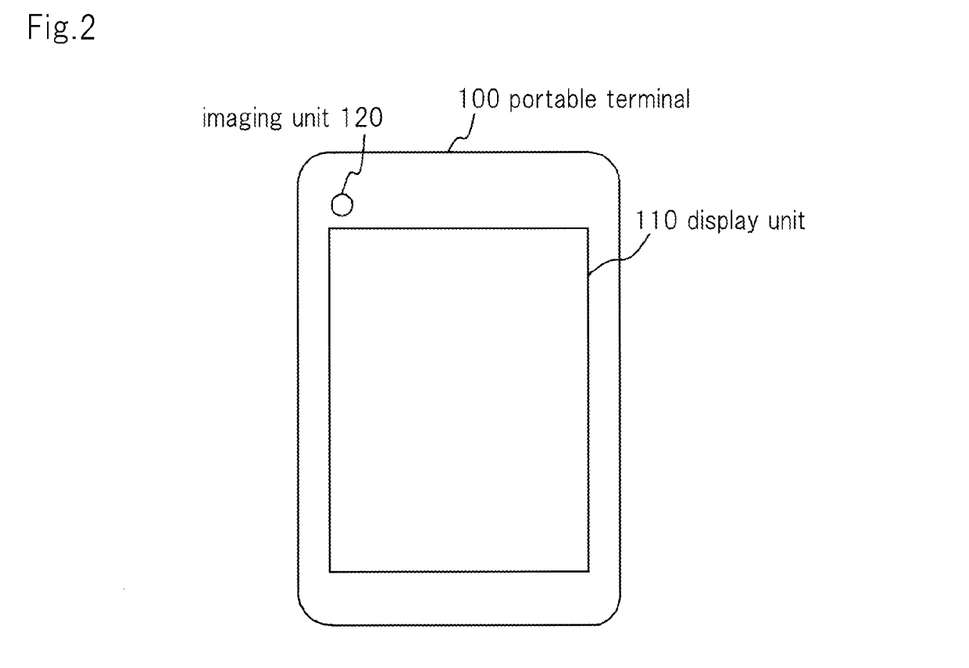
FIG. 2 is an outer perspective view of the portable terminal shown in FIG. 1.

FIG. 1 is a block diagram showing an exemplary embodiment of the portable terminal in which the image display device of the present invention is applied. In addition, FIG. 2 is an outer perspective view of portable terminal 100 shown in FIG. 1. The portable terminal is, for example, a tablet terminal, a smartphone, a digital camera, a portable telephone, a portable game device, or a portable music player.

As shown in FIG. 1, portable terminal 100 of the present exemplary embodiment is equipped with: display unit 110, imaging unit 120, control unit 130, and acceleration sensor 140.

Display unit 110 displays, for example, images based on data that are stored in portable terminal 100 or images that display input screens for receiving various input from, for example, the user of portable terminal 100.

Upon receiving an imaging instruction that is supplied from control unit 130, imaging unit 120 captures the image of a subject that faces display unit 110. Accordingly, when there is a viewer who is viewing display unit 110, imaging unit 120 captures an image of the face of this viewer. Imaging unit 120 then supplies the image data that indicates the captured image to control unit 130.

Acceleration sensor 140 detects the degree of acceleration for each of a plurality of axial directions, for example, the vertical, horizontal, and depth axes of portable terminal 100.

Control unit 130 is equipped with estimation unit 131, motion detection unit 132, display orientation determination unit 133, and display orientation alteration unit 134.

Motion detection unit 132 detects motion of the user of portable terminal 100 with respect to portable terminal 100. More specifically, motion detection unit 132 computes the sum of the amounts of change in the degree of acceleration of each of a plurality of axial directions that are detected in acceleration sensor 140 as the amount of change of acceleration that was applied to portable terminal 100 according to the motion of the user of portable terminal 100 with respect to portable terminal 100. When the computed acceleration change amount exceeds a predetermined threshold value, motion detection unit 132 then supplies change detection information that indicates this status to display orientation determination unit 133.

Figure 3:
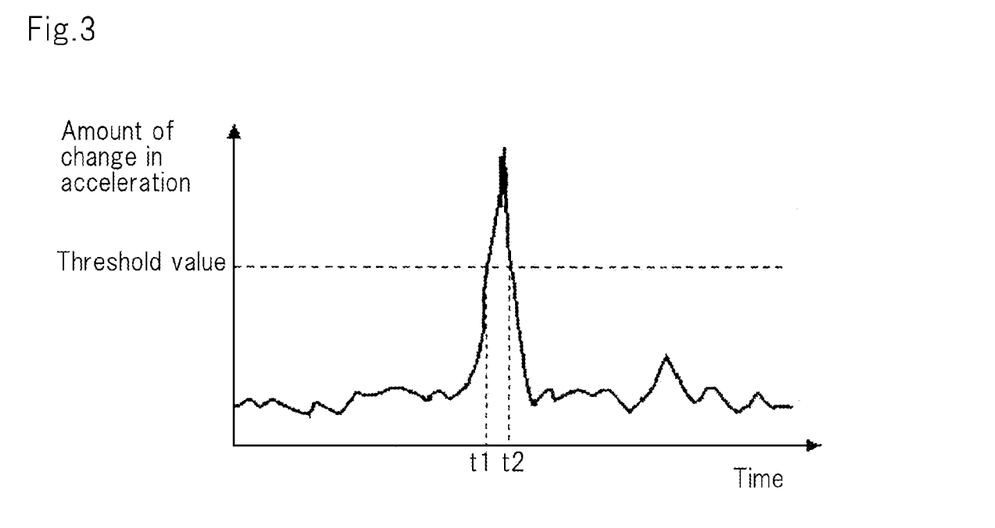
FIG. 3 shows an example of the amount of change of acceleration that is computed by the motion detection unit shown in FIG. 1.

FIG. 3 shows an example of the amount of change in acceleration that is computed by motion detection unit 132 shown in FIG. 1.

In the example shown in FIG. 3, the acceleration change amount that is computed exceeds the threshold value at time t1. In this case, motion detection unit 132 supplies change detection information to display orientation determination unit 133 after time t1.

Referring again to FIG. 1, estimation unit 131 receives image data that are supplied as output from imaging unit 120 and recognizes a person's face based on the image shown by the received image data. Estimation unit 131 next distinguishes the positions of each of the constituent parts of the face that was recognized. Here, the position of each constituent part that is distinguished is a position with respect to imaging unit 120. Estimation unit 131 next distinguishes the positions of each constituent part of the recognized face with respect to display unit 110 based on the positional relation of display unit 110 and imaging unit 120. Estimation unit 131 further uses, for example, a sensor (not shown) to detect the positional relation between display unit 110 and imaging unit 120. Estimation unit 131 next judges the upward and downward directions of the recognized face based on the positions of each of the constituent parts that were distinguished with respect to display unit 110, whereby the inclination of the recognized face with respect to display unit 110 is estimated. Estimation unit 131 then supplies as output to display orientation determination unit 133 first direction information that indicates, of the upward and downward directions that were judged, the direction that is to be the upward direction.

Figure 4:
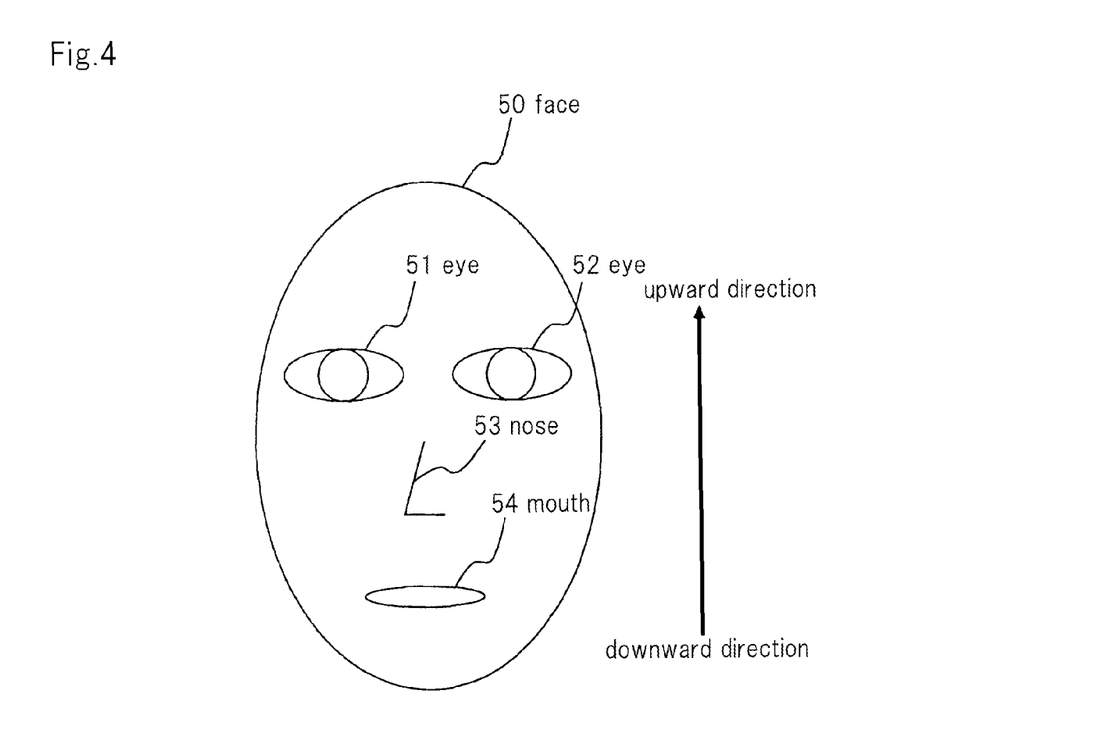
FIG. 4 is a schematic view of a face for describing an example of operations in which the estimation unit shown in FIG. 1 distinguishes upward and downward directions of a recognized face.

FIG. 4 is a schematic view of a face for describing an example of the operation by which estimation unit 131 shown in FIG. 1 distinguishes the upward and downward directions of a recognized face.

In FIG. 4, the constituent parts of face 50 that are recognized by estimation unit 131 are eyes 51 and 52, nose 53, and mouth 54. Estimation unit 131 distinguishes from the outline of face 50 the positions of eyes 51 and 52 and the position of at least one of nose 53 and mouth 54. Estimation unit 131 then judges the direction from the midpoint of eye 51 and eye 52 toward nose 53 or mouth 54 to be the downward direction in the recognized face. Alternatively, estimation unit 131 judges the opposite direction to be the upward direction in the recognized face.

Referring again to FIG. 1, upon receiving change detection information that was supplied from motion detection unit 132, display orientation determination unit 133 supplies an imaging instruction to imaging unit 120. Display orientation determination unit 133 then receives the first direction information that was supplied from estimation unit 131. Display orientation determination unit 133 then determines from the direction indicated by the received first direction information the side of the four sides of display unit 110 that is to be the upward direction. Display orientation determination unit 133 then supplies second direction information that indicates the side that was determined to display orientation alteration unit 134.

Figure 5:
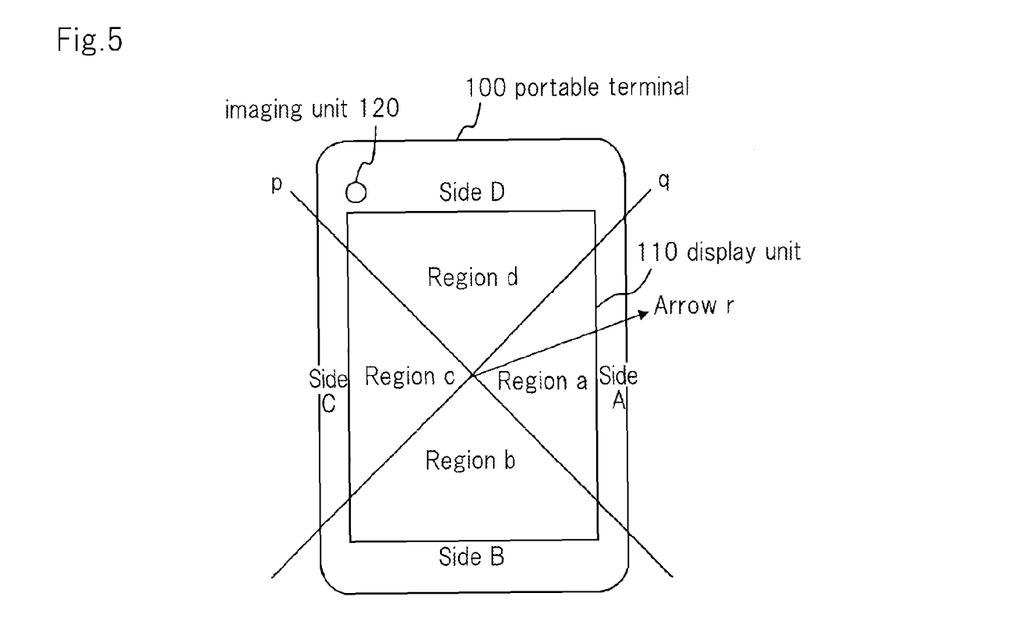
FIG. 5 is a view for describing an example of operations in which the display orientation determination unit shown in FIG. 1 determines which of the four sides of the display unit is to be the upward direction.

FIG. 5 is a view for describing an example of the operations by which display orientation determination unit 133 shown in FIG. 1 determines the side from among the four sides of display unit 110 that is to be the upper side.

Display orientation determination unit 133 recognizes each of region a, region b, region c, and region d that result from using inclined line p and inclined line q that intersect at the center of display unit 110 to divide display unit 110. Display orientation determination unit 133 further recognizes each of the four sides of display unit 110, side A, side B, side C and side D. Display orientation determination unit 133 then stores in association each of region a and side A, region b and side B, region c and side C, and region d and side D.

When the direction indicated in first direction information that is received is, for example, the direction of arrow r, display orientation determination unit 133 determines that, of the four sides of display unit 110, side A that corresponds to region a that includes the direction of arrow r is the side that is to be in the upward direction. Similarly, when the direction indicated in the first direction information that is received is contained in region b, side B that corresponds to region b is determined as the side that is to be in the upward direction.

Referring again to FIG. 1, display orientation alteration unit 134 receives second direction information that is supplied from display orientation determination unit 133. Display orientation alteration unit 134 then changes the orientation of the image that is displayed on display unit 110 with the side that is indicated by the received second direction information as the upward direction.

The operation of portable terminal 100 that is configured as described above is next described.

Figure 6:
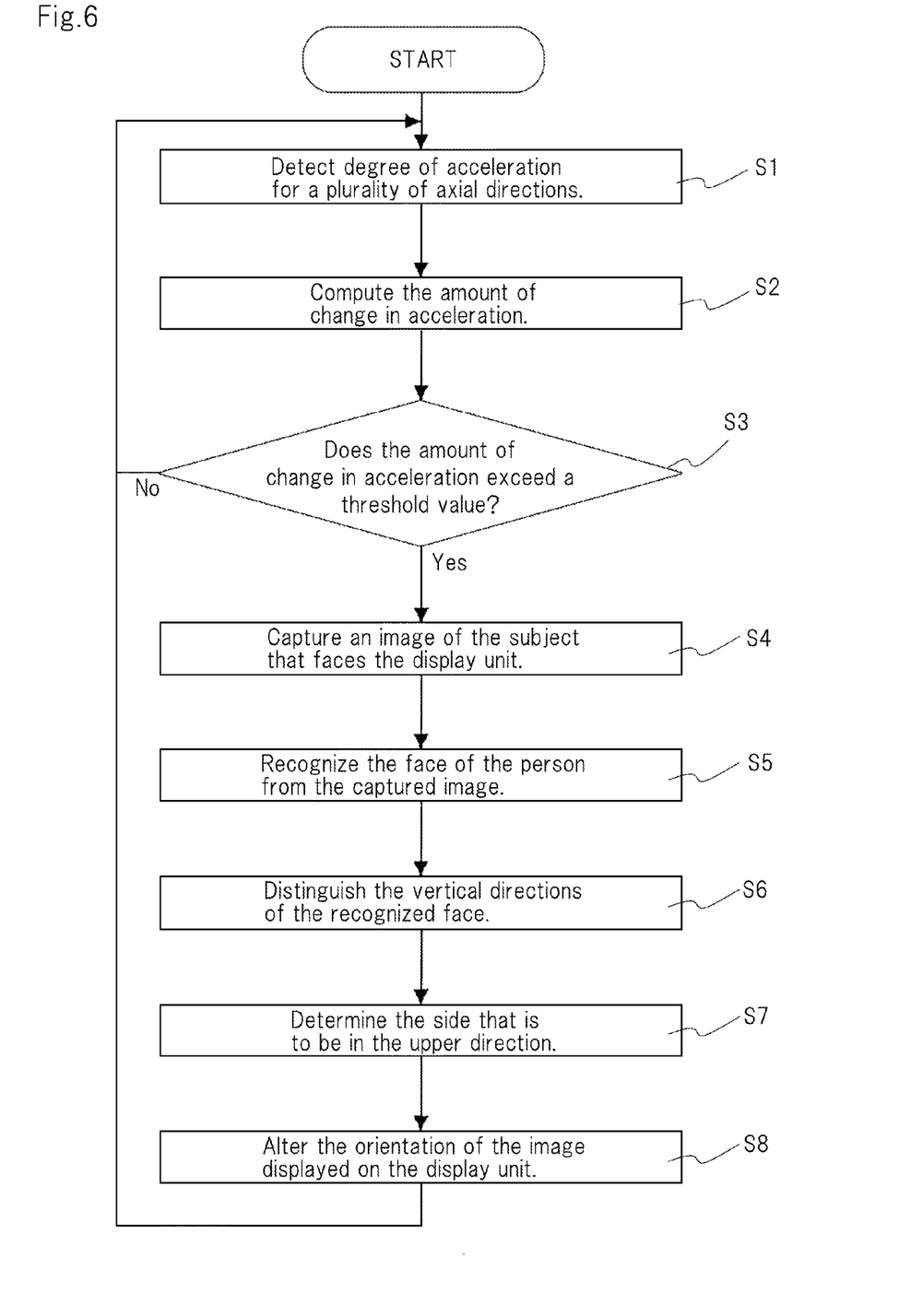
FIG. 6 is a flow chart for describing the operations of the portable terminal shown in FIGS. 1-5.

FIG. 6 is a flow chart for describing the operations of portable terminal 100 shown in FIGS. 1-5.

Acceleration sensor 140 detects the degree of acceleration for the plurality of axial directions (Step S1).

Motion detection unit 132 computes the sum of the amounts of change of the degree of acceleration of each of the plurality of axial directions that were detected in acceleration sensor 140 as the amount of change of acceleration applied to portable terminal 100 (Step S2).

Motion detection unit 132 next judges whether the amount of change of acceleration that was computed exceeds the threshold value (Step S3).

If, as the judgment result in Step S3, the computed amount of change in acceleration does not surpass the threshold value, the operation transitions to Step S1 and detection of the degree of acceleration for the plurality of axial directions is continued.

On the other hand, if, as the result of the judgment in Step S3, the amount of change that was computed surpasses the threshold value, motion detection unit 132 supplies change detection information to display orientation determination unit 133.

Display orientation determination unit 133 that has received the change detection information that was supplied from motion detection unit 132 supplies an imaging instruction to imaging unit 120.

Imaging unit 120 that has received the imaging instruction that was supplied from display orientation determination unit 133 captures an image of the subject that faces display unit 110 (Step S4).

Imaging unit 120 then supplies image data that indicate the image that was captured to estimation unit 131.

Estimation unit 131 that has received the image data that was supplied from imaging unit 120 recognizes a person's face based on the image that is indicated by the received image data (Step S5).

Estimation unit 131 next distinguishes the positions with respect to imaging unit 120 of each of the constituent parts of the face that was recognized.

Based on the positional relation of display unit 110 and imaging unit 120, estimation unit 131 next distinguishes the positions with respect to display unit 110 of each of the constituent parts of the recognized face.

Estimation unit 131 then judges the vertical directions of the face that was recognized in step S5 based on the positions with respect to display unit 110 of each of the constituent parts of the face that were distinguished (Step S6).

Estimation unit 131 then supplies as output to display orientation determination unit 133 first direction information that indicates, of the vertical directions that were judged, the direction that is to be the upward direction.

Display orientation determination unit 133 that has received the first direction information that was supplied from estimation unit 131 determines based on the direction indicated by the received first direction information the side of the four sides of display unit 110 that is to be in the upward direction (Step S7).

Display orientation determination unit 133 then supplies second direction information that indicates the side that was determined to display orientation alteration unit 134.

Display orientation alteration unit 134 that has received the second direction information that was supplied from display orientation determination unit 133 then changes the orientation of the image that is displayed on display unit 110 with the side that was indicated by the received second direction information in the upward direction (Step S8).

The operation then transitions to Step S1, and detection of the degree of acceleration for the plurality of axial directions continues.

Portable terminal 100 in this exemplary embodiment detects motion with respect to portable terminal 100 by the user of portable terminal 100, and when a predetermined motion is detected, estimates the inclination with respect to display unit 110 of the person's face based on an image that is captured in imaging unit 120.

Portable terminal 100 then changes the orientation of the image displayed on display unit 110 according to the estimated inclination.

In this way, orientation of the displayed image that impedes viewing can be avoided without entailing a loss of convenience.

In addition, the timing at which estimation unit 131 estimates the inclination with respect to display unit 110 of the person's face is set in the present exemplary embodiment as an example in which the amount of change of acceleration that was computed exceeds a threshold value. As a result, the orientation of the image displayed on display unit 110 will not change due to, for example, the viewer of display unit 110 briefly looking away or due to changes in facial expression. In addition, the user of portable terminal 100 can intentionally vary the acceleration applied to portable terminal 100 by, for example, shaking portable terminal 100 and thus can freely determine the timing at which estimation unit 131 estimates the inclination of a person's face with respect to display unit 110.

Still further, in the present exemplary embodiment, each of motion detection unit 132, display orientation determination unit 133, and display orientation alteration unit 134 may be configured to execute the above-described predetermined operations after the amount of change in acceleration that was computed falls below a threshold value once the amount of change in acceleration applied to portable terminal 100 has surpassed a threshold value.

In this case, when the amount of change in acceleration that is computed by motion detection unit 132 is, for example, in transition such as shown in FIG. 3, each of motion detection unit 132, display orientation determination unit 133, and display orientation alteration unit 134 executes the above-described predetermined operations after time t2 at which the computed amount of change in acceleration falls below the threshold value. More specifically, for example, motion detection unit 132 supplies change detection information after time t2. In other words, the change detection information is supplied after extreme changes in the acceleration applied to portable terminal 100 have ceased.

In this way, the problem of changes of the orientation of images displayed on display unit 110 that are unintended by the user can be avoided.

In the present exemplary embodiment, a case is assumed in which imaging unit 120 captures the image of one person's face. However, a plurality of persons may view display unit 110, and in such cases, the possibility arises that imaging unit 120 will capture the image of a plurality of faces.

When imaging unit 120 has captured the image of a plurality of faces, the largest face from among the plurality of faces contained in the captured image or the face that is located closest to portable terminal 100 depending on the degree of overlap from among the plurality of faces should be taken as the face that is the object for judging the vertical directions. Alternatively, an image of the face of the user of portable terminal 100 may be stored in portable terminal 100 in advance and the face from among the plurality of faces that is the closest to the stored image then taken as the face that is the object to be used for judging the vertical direction.

In the present exemplary embodiment, an example was described in which estimation unit 131 estimates the inclination of a person's face with respect to display unit 110 based on the amount of change in acceleration that is applied to portable terminal 100, but the time at which the user of portable terminal 100 touches display unit 110 may also be taken as the timing at which estimation unit 131 estimates the inclination of a person's face with respect to display unit 110. Alternatively, if for example portable terminal 100 is of the clamshell type, the time at which the user of portable terminal 100 opens the portable terminal 100 may be taken as this timing. If portable terminal 100 is of the sliding type, the time at which the user slides open portable terminal 100 may be taken as this timing. Still further, if portable terminal 100 has a conversation capability, the time at which conversation ends may be taken as this timing.

Although a case was described in the present exemplary embodiment in which estimation unit 131 estimates the inclination of a person's face with respect to display unit 110 when the computed amount of change in acceleration exceeds a threshold value, estimation unit 131 may estimate the inclination of the person's face with respect to display unit 110 when the amount of change of acceleration that is computed exceeds a threshold value continuously for a predetermined time interval. Alternatively, estimation unit 131 may estimate the inclination of a person's face with respect to display unit 110 when the amount of change in acceleration that is computed exceeds a threshold value a predetermined number of times within a predetermined time interval. In this way, changes in the orientation of the image that is displayed on display unit 110 can be avoided when, for example, the degree of acceleration is erroneously detected.

Although acceleration sensor 140 was used to detect motion of the user of portable terminal 100 in the present exemplary embodiment, other sensors may be used such as an angle sensor or a non-contact sensor for sensing by non-contact whether an object is present in the vicinity.

In the present invention, processing in the image display device may be executed not by the above-described dedicated hardware, but rather, by recording a program for realizing these functions on a recording medium that can be read in the image display device and then having the image display device read and execute the program that is recorded on this recording medium. The recording medium that can be read in the image display device may be an installable/removable recording medium such as a flexible disk, a magneto-optic disk, a DVD, or a CD, or may be, for example, an HDD that is incorporated in the image display device.

Although the invention of the present application was described with reference to an exemplary embodiment, the invention of the present application is not limited to the above-described exemplary embodiment. The configuration and details of the invention of the present application are open to various modifications within the scope of the invention of the present application that will be clear to one of ordinary skill in the art.

This application claims the benefits of priority based on Japanese Patent Application No. 2011-026101 for which application was submitted on Feb. 9, 2011 and incorporates by citation all of the disclosures of that application.

What is claimed is:

1. An image display device comprising:
    a display unit that displays an image;
    an imaging unit that captures an image of a subject that faces said display unit;
    a detection unit that detects motion with respect to the image display device by the user of the image display device;
    an estimation unit that, when predetermined motion is detected by said detection unit, estimates inclination of a person's face with respect to said display unit based on an image that was captured by said imaging unit; and
    a display orientation alteration unit that alters the orientation of an image displayed on said display unit according to said inclination that was estimated, wherein
    a time during which the inclination of the person's face is estimated is at least one of a time at which the display unit is touched, a time at which a portable terminal is opened, and a time at which the portable terminal is opened by sliding action.

2. The image display device as set forth in claim 1, wherein:
    said detection unit detects acceleration that is applied to the image display device; and
    said estimation unit, when the amount of change in acceleration that was detected exceeds a threshold value that is determined in advance, estimates the inclination of a person's face with respect to said display unit based on an image that is captured by said imaging unit.

3. The image display device as set forth in claim 1, wherein said estimation unit distinguishes the position of each constituent part of said face, and by judging the vertical directions of the face based on the positions of each of the constituent parts that were distinguished, estimates the inclination of the face with respect to said display unit.

4. An image display method in an image display device that is equipped with a display unit that displays images, comprising:
    a process of capturing an image of a subject that faces said display unit;
    a detection process of detecting motion with respect to the image display device by the user of the image display device;
    an estimation process of, when predetermined motion is detected in said detection process, estimating the inclination of the face of a person with respect to said display unit based on said image that was captured; and
    a process of altering the orientation of an image that is displayed on said display unit according to said inclination that was estimated, wherein
    a time during which the inclination of the person's face is estimated is at least one of a time at which the display unit is touched, a time at which a portable terminal is opened, and a time at which the portable terminal is opened by sliding action.

5. The image display method as set forth in claim 4, wherein:
    said detection process is a process of detecting acceleration that is applied to the image display device; and said estimation process is a process of, when said amount of change of acceleration that was detected exceeds a threshold value that is determined in advance, estimating inclination of a person's face with respect to said display unit based on said image that was captured.

6. The image display method as set forth in claim 4, wherein, in said estimation process, the position of each constituent part of said face is distinguished, and the inclination of the face with respect to said display unit is estimated by judging the vertical directions of the face based on the positions of each of the constituent parts that were distinguished.

7. A non-transitory tangible media storing therein a program that causes an image display device that is equipped with a display unit that displays images to execute:
   a function of capturing the image of a subject that faces said display unit;
   a detection function of detecting motion with respect to the image display device by the user of the image display device;
   an estimation function of, when a predetermined motion is detected by said detection function, estimating the inclination of a person's face with respect to said display unit based on said image that was captured; and
   a function of altering the orientation of an image that is displayed on said display unit according to said inclination that was estimated, wherein
   a time during which the inclination of the person's face is estimated is at least one of a time at which the display unit is touched, a time at which a portable terminal is opened, and a time at which the portable terminal is opened by sliding action.

8. The media as set forth in claim 7, wherein:
   said detection function is a function of detecting acceleration that is applied to the image display device; and
   said estimation function is a function of, when said amount of change of acceleration that is detected exceeds a threshold value that is set in advance, estimating the inclination of a person's face with respect to said display unit based on said image that was captured.

9. The media as set forth in claim 7, wherein, in said estimation function, the position of each constituent part of said face is distinguished, and the inclination of the face with respect to said display unit is estimated by judging the vertical directions of the face based on the positions of each of the constituent elements that were distinguished.

* * * * *